United States Patent [19]

Dye et al.

[11] Patent Number: 5,667,678

[45] Date of Patent: Sep. 16, 1997

[54] PLASTIC FLUID FILTER AND METHOD FOR ASSEMBLING SAME

[75] Inventors: Richard Dye, Warren, N.J.; John Lowsky, Fayetteville, N.C.

[73] Assignee: Advanced Performance Technology, Inc., Lugoff, S.C.

[21] Appl. No.: 426,748

[22] Filed: Apr. 13, 1995

[51] Int. Cl.$^6$ .................................................... B01D 27/08
[52] U.S. Cl. ........................... 210/232; 210/446; 210/443; 210/444; 210/450; 210/451
[58] Field of Search ................... 210/94, 232, 416.4, 210/416.5, 440, 443, 444, 450, 451, 452, 497.01; 156/293, 295

[56] References Cited

U.S. PATENT DOCUMENTS

| | | |
|---|---|---|
| Re. 34,031 | 8/1992 | Thomsen et al. . |
| Re. 34,050 | 9/1992 | Thomsen et al. . |
| 692,377 | 2/1902 | Speer . |
| 1,690,358 | 11/1928 | Babitch . |
| 2,083,005 | 6/1937 | Czarnecki . |
| 2,202,403 | 5/1940 | Sandberg . |
| 2,563,548 | 8/1951 | Plante . |
| 2,858,026 | 10/1958 | Lorimer . |
| 2,932,400 | 4/1960 | Scavuzzo . |
| 3,000,506 | 9/1961 | Hultgren . |
| 3,265,213 | 8/1966 | Decker et al. . |
| 3,297,160 | 1/1967 | Humbert, Jr. . |
| 3,333,703 | 8/1967 | Scavuzzo et al. . |
| 3,485,380 | 12/1969 | Offer et al. . |
| 3,502,218 | 3/1970 | Tuffnell et al. . |
| 3,502,221 | 3/1970 | Butterfield . |
| 3,722,691 | 3/1973 | Francois . |
| 4,052,307 | 10/1977 | Humbert, Jr. . |
| 4,253,954 | 3/1981 | Midkiff et al. . |
| 4,314,903 | 2/1982 | Hanley . |
| 4,324,660 | 4/1982 | Peyton et al. . |
| 4,369,113 | 1/1983 | Stifelman . |
| 4,676,895 | 6/1987 | Davis . |
| 4,692,245 | 9/1987 | Church et al. ............ 210/444 |
| 4,702,790 | 10/1987 | Hogh et al. ............ 210/454 |
| 4,721,563 | 1/1988 | Rosaen . |
| 4,740,299 | 4/1988 | Popoff et al. . |
| 4,824,567 | 4/1989 | Turman ............ 210/416.4 |

(List continued on next page.)

FOREIGN PATENT DOCUMENTS

| | | |
|---|---|---|
| 229092 | 8/1963 | Austria . |
| 0221675 | 5/1987 | European Pat. Off. . |
| 2082912 | 12/1971 | France . |
| 57-70709 | 11/1982 | Japan . |
| 982548 | 2/1965 | United Kingdom . |
| 1355832 | 6/1974 | United Kingdom . |

*Primary Examiner*—W. L. Walker

[57] ABSTRACT

A one-piece plastic injection molded filter housing having first and second open ends, the first end being threaded to receive a separate water collection bowl, and the second end including an external annular recess. An injection molded end plate member includes a circumferential annular flange with an interior annular rib formed thereon, and an inward annular projection with an external thread formed thereon. Opposing, one-piece plastic upper and lower end caps include spaced flanges to receive the respective ends of a filter media therebetween. The upper end cap also includes an upper annular projection that has an internal thread. A hollow plastic molded center tube is used inside a cylindrical paper media. The upper end cap is screwed into the end plate member via the corresponding threads. The rib has an inner diameter less than the outer diameter of the second end of the housing. Adhesive is applied to the rib and the end plate member is connected to the housing, so that the rib fits into the recess on the housing via an interference fit. The method for manufacturing the filter includes the following steps: forming the cylindrical paper media; inserting a plastic center tube into the cylindrical media and connecting the plastic upper and lower end caps to the media and center tube combination to form a media element; screwing the upper end cap onto the end plate member; and connecting the end plate member to the second end of the housing, so that the rib and recess cooperate to fix the end cap member on the housing via an interference fit.

48 Claims, 7 Drawing Sheets

U.S. PATENT DOCUMENTS

| | | |
|---|---|---|
| 4,836,923 | 6/1989 | Popoff et al. . |
| 4,956,089 | 9/1990 | Hurst .................................... 210/484 |
| 4,976,852 | 12/1990 | Janik et al. . |
| 4,992,166 | 2/1991 | Lowsky et al. . |
| 4,999,108 | 3/1991 | Koch et al. . |
| 5,017,285 | 5/1991 | Janik et al. . |
| 5,035,797 | 7/1991 | Janik . |
| 5,066,391 | 11/1991 | Faria . |
| 5,084,170 | 1/1992 | Janik et al. . |
| 5,096,575 | 3/1992 | Cosack . |
| 5,098,559 | 3/1992 | Mack et al. . |
| 5,104,537 | 4/1992 | Stifelman et al. . |
| 5,114,572 | 5/1992 | Hunter et al. . |
| 5,118,417 | 6/1992 | Deibel . |
| 5,128,034 | 7/1992 | Kool . |
| 5,137,557 | 8/1992 | Behrendt et al. . |
| 5,171,430 | 12/1992 | Beach et al. . |
| 5,182,015 | 1/1993 | Lee . |
| 5,186,829 | 2/1993 | Janik . |
| 5,211,846 | 5/1993 | Kott et al. . |
| 5,236,579 | 8/1993 | Janik et al. . |
| 5,238,717 | 8/1993 | Boylan . |
| 5,259,953 | 11/1993 | Baracchi et al. . |
| 5,277,157 | 1/1994 | Teich . |
| 5,342,519 | 8/1994 | Friedman et al. . |
| 5,374,355 | 12/1994 | Habiger et al. . |
| 5,433,241 | 7/1995 | Robinson . |
| 5,456,834 | 10/1995 | Bowlsbey . |
| 5,484,466 | 1/1996 | Brown et al. . |

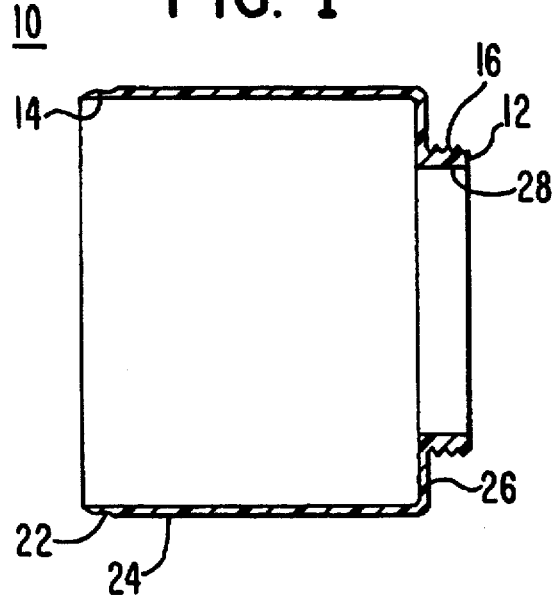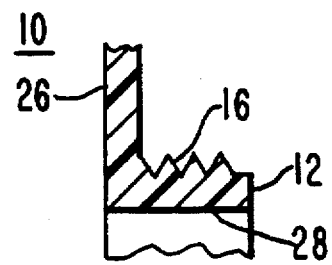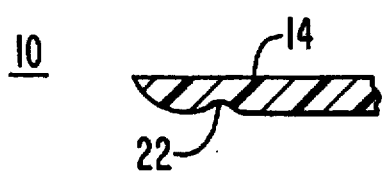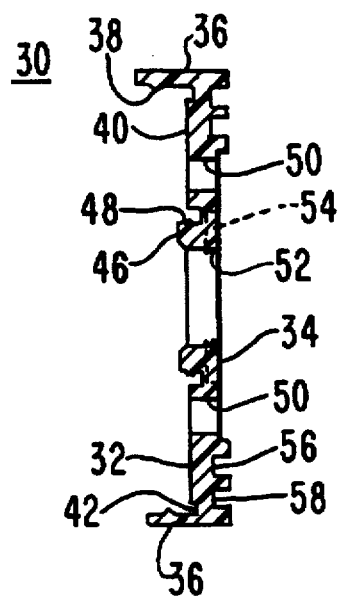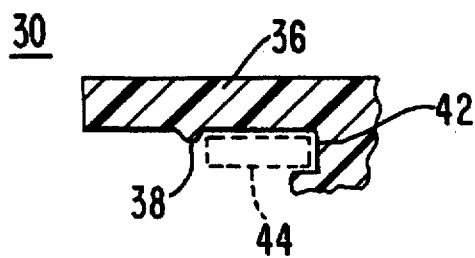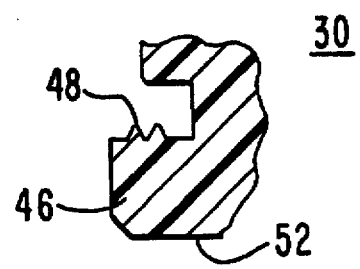

PLASTIC FLUID FILTER AND METHOD FOR ASSEMBLING SAME

BACKGROUND OF THE INVENTION

This invention relates to fluid filters and, more particularly, to a plastic fuel filter that can separate contaminating water from the fuel, and a method for manufacturing such a filter.

The filter art includes various filters that can separate water from fuel, known as fuel water separators. See, e.g. U.S. Pat. Nos. 3,297,160; 3,502,218; 4,253,954; 4,676,895; and 4,740,299. These filters are often used in diesel fuel systems for trucks.

U.S. Pat. No. 4,740,299, in particular, relates to a metal housing for a paper filter media that is directed to separating water from fuel. More specifically, this filter includes the following components: a drawn cylindrical metal housing having two open ends; a plastic, threaded adaptor ring fixedly and sealingly received at one open end via a structural adhesive; a cylindrical filter element placed within the housing, made of pleated filter media paper surrounding a metal center tube, and terminated by metal circular end caps; a thick metal end plate including a threaded central outlet aperture and radial inlets; one of several gasket retainers is attached exteriorly to the end plate depending upon which gasket diameter is required, the end plate/retainer combination being attached to the other open end of the filter housing by seaming the interface thereof; a rubber grommet between one of the end caps and the end plate; a gasket received in the gasket retainer; and a separate plastic collection bowl screwed onto the threaded adaptor. The complete filter is screwed onto a threaded post formed on a mount in a fuel line via the threaded central aperture of the end plate.

During use, which occurs at about up to 40 p.s.i., diesel fuel is introduced through the mount and circulated inside out relative to the media. The conventional water-stripping media causes water present in the diesel fuel to coalesce on the outside of the media. The bowl collects the separated water after it runs down along the outside of the media and across the adaptor. When the filter has reached its capacity, the old filter is removed from the mount, the bowl is removed from the filter housing and emptied, a new filter housing is screwed onto the mount, and the same bowl is screwed on the new filter housing.

The manufacturing steps for producing such a filter include basically the following: the housing is drawn; media paper is pleated, cured, cut and clipped to form a cylinder; the center tube is inserted in the media cylinder and the end caps are attached to the media via Plastisol and cured to form a media element; the adaptor receives the adhesive, which is very expensive, and the adaptor is positioned in the housing; the rubber grommet is added to the element and the element is placed in the housing; and the end plate/gasket retainer combination is formed and sealed to the other end of the housing.

This filter, since it includes numerous parts that must be stamped, molded and/or seamed, and since it depends upon a multi-step manufacturing process, is relatively expensive to produce.

Further, this type of filter is relatively environmentally unfriendly. That is, the filter includes metal, paper, rubber and plastic components. It is very costly, time-consuming and labor intensive to recycle such a multi-component product after use. Many states are currently considering steps to tax the disposal of used metal oil filters or simply refuse to dispose of same in landfills.

Separately, the filter art has made attempts to provide filters that rely more on plastics in an effort to minimize the material costs, parts and assembly steps. These plastic filters, however, do not appear to have proved commercially successful. For example, some attempts related to plastic automotive oil filters have suffered because the plastics chosen have not been able to withstand the significant temperature and pressure associated with oil filters. These filters also may not decrease the manufacturing steps or raw material costs, and they may not be particularly well-suited for recycling.

U.S. Pat. No. 5,171,430, relates to a filter assembly for fluids in which the filter has a unitary shell including an injection molded threaded end and an integral blow molded closed end, a replaceable filter element and a threaded end plate. While this patent indicates a goal of cost effectiveness, the fact that separate injection molding and blow molding steps must be performed thwarts this goal, because such multiple molding steps would be relatively expensive.

Although the prior art described above eliminates some of the problems inherent in the filter art, the prior art above still does not teach a plastic fluid filter and related method of assembly capable of the most cost-efficient production, the most reliable operation, the most environmentally friendly filter, or the most time-efficient automated assembly.

SUMMARY OF THE INVENTION

Accordingly, it is a purpose of the present invention to provide a fluid filter that is easier and more cost-effective to manufacture.

It is another purpose of the present invention to provide a fluid filter whose non-filtration components can be manufactured out of plastic less expensively than their conventional metal counterparts.

It is another purpose of the present invention to provide a fluid filter whose components do not require any machining or curing, but instead are injection molded out of a plastic resin.

It is another purpose of the present invention to provide a fuel water separator that can be easily replaced on a conventional threaded mount.

It is another purpose of the present invention to provide a fluid filter that is made of plastic, except the paper filter media.

It is another purpose of the present invention to provide a plastic fluid filter that is capable of efficiently removing water from fuel.

It is another purpose of the present invention to provide a fluid filter that is less expensively manufactured by combining the end plate and gasket retainer into one molded piece, eliminating the grommet between the plate upper end and the end plate, and incorporating an interference fit between the end plate and the housing.

It is another purpose of the present invention to provide a molded gasket retainer that can be used with different-sized gaskets.

It is another purpose of the present invention to provide a fluid filter that is more environmentally friendly.

It is another purpose of the present invention to provide a plastic fuel water separator that does not need a separate bowl to be attached thereto.

It is another purpose of the present invention to provide a plastic fuel water separator whose plastic components can be recycled after use, and whose paper filter media can be burned to create energy for the manufacturing or recycling of like filters.

It is another purpose of the present invention to provide a method for producing a fluid filter that is more cost, labor and time efficient.

It is another purpose of the present invention to provide a method for producing a plastic fluid filter that requires fewer steps than conventional methods used to produce predominantly metal filters.

It is another purpose of the present invention to provide a method for producing a fluid filter that can be made without the need to seam or thread an end cap to a housing.

It is still another purpose of the present invention to provide a fluid filter and methods for manufacturing same which are relatively simple and have a minimal number of components and steps, respectively, thereby ensuring low-cost, automated, mass production.

Finally, it is a purpose of the present invention to provide a plastic fuel water separator and related method of assembly that are more cost effective and environmentally friendly than the fuel water separators known in the art.

To achieve the foregoing and other purposes of the present invention there is provided a recyclable, spin on, integral filter including a filter housing having first and second open ends, said housing being injection molded as one piece from plastic. The first end of the housing is threaded to receive a separate water collection bowl. The second end of the housing includes an external annular recess that receives by an interference fit an annular rib formed on a one piece plastic molded end plate member. The end plate member also includes on an exterior surface integrally therewith at least one gasket retainer and on an opposite, interior surface thereof an annular projection with an external thread. Upper and lower end caps are also each molded as one piece from plastic to include a circumferential annular flange and an inward annular flange which receive the respective ends of the filter media therebetween. One surface of the upper end cap also includes an annular projection that has an internal thread for cooperating with the external thread on the annular projection of the end plate member. A hollow plastic molded center tube is located inside a paper media that is cut, cured and clipped into a cylinder. The upper end cap is screw threaded into the end plate member via the corresponding threads. Adhesive is applied to the area of the rib on the end plate member, and the end plate member is connected to the second end of the housing via an interference fit, i.e. the rib fits into the recess, which rib has an inner diameter less than the outer diameter of the second end of the housing.

The method of manufacture of the filter includes a first step of forming a cylindrical paper filter media. A second step relates to the insertion of the plastic center tube into the cylindrical media and application of the plastic upper and lower end caps to the media and center tube combination to form a media element. In a third step, the upper end cap is screwed onto the underside of the end plate member. In a fourth step, the media element is loaded in the housing. In a fifth step, the end plate member, which is molded to include a gasket retainer, a central threaded aperture and fluid inlets, has a small amount of adhesive applied near the rib, and is pushed against the second end of the housing, fitting the rib in the recess formed thereon and creating an interference fit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a side, cross sectional view of a plastic filter housing according to the preferred embodiment of the present invention.

FIG. 2 is a partial exploded view of the housing shown in FIG. 1, illustrating particularly an exteriorally threaded first end of the housing intended to receive a separate threaded bowl.

FIG. 3 is a partial exploded view of the housing shown in FIG. 1, illustrating particularly an opposite second end of the housing including a recess formed exteriorally thereon.

FIG. 4 is a side, cross sectional view of an end plate member according to the preferred embodiment of the present invention.

FIG. 5 is a partial enlarged view of one portion of the end plate member shown in Fig. 4, illustrating particularly a rib formed interiorally on a circumferential, annular flange.

FIG. 6 is a partial enlarged view of the end plate member shown in FIG. 4, illustrating particularly an exteriorally threaded projection formed thereon.

DESCRIPTION OF THE PREFERRED EMBODIMENTS

The preferred embodiments of the present invention will now be described in detail with reference to FIGS. 1–16 herein.

Figure 12:
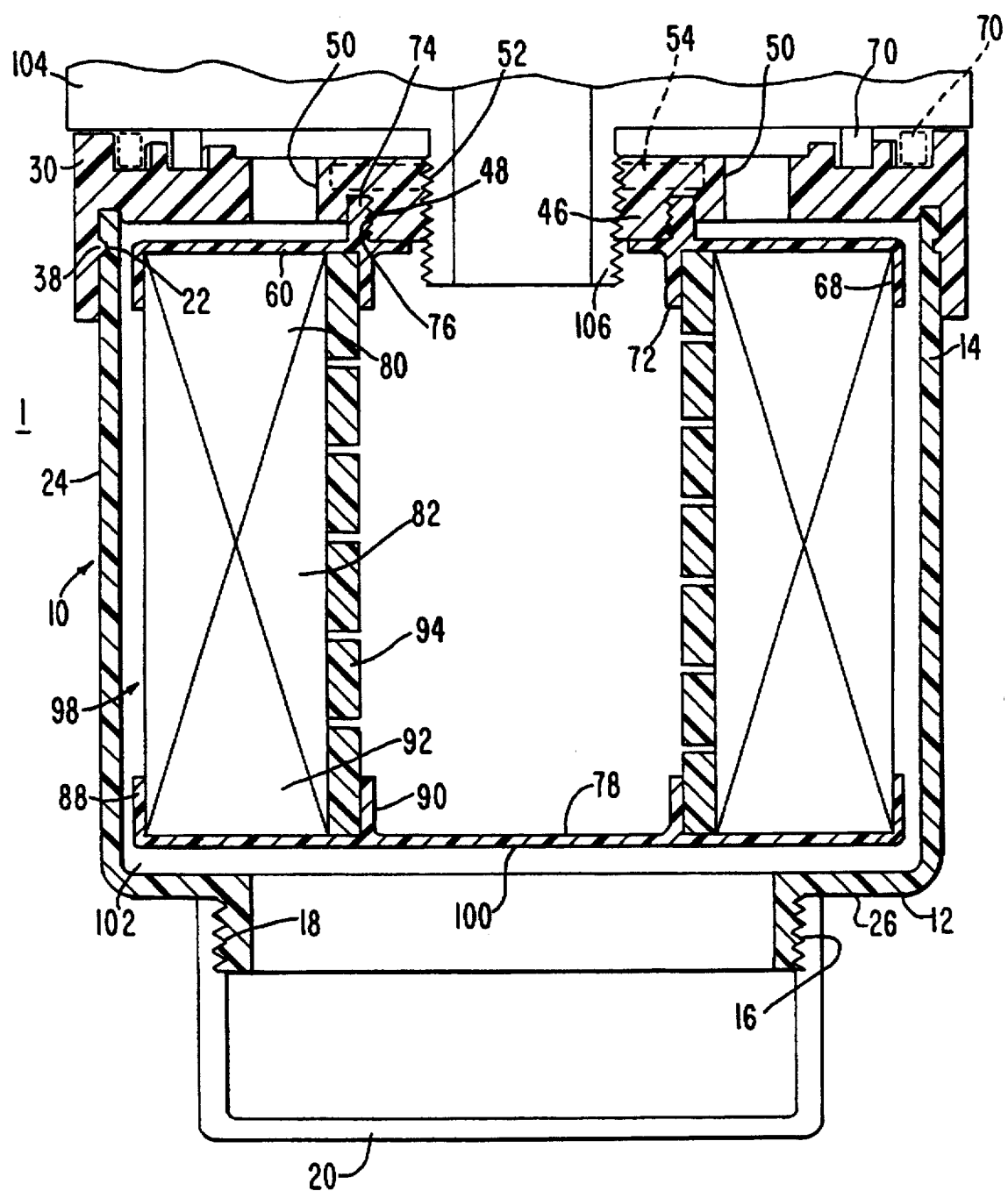
FIG. 12 is a side, cross sectional view of the assembled filter according to the preferred embodiment of the present invention.

FIGS. 1 and 12 illustrate the filter according to the present invention. The filter 1 includes a housing 10, which is shown in FIG. 1 as generally cylindrical and having a first open end 12 and a second open end 14. The housing 10 is injection molded as one piece from plastic. Preferably, the plastic is clear Capron™ 8202, Zytel™ 330, Nylon™ 6, Minlon™, Zytel™, Rynite™, or another Nylon™ derivative available from e.g. General Electric or DuPont. Paintable or colored versions of these plastics could also be used.

As best shown in FIGS. 1 and 2, the first end 12 of the housing 10 includes an external thread 16. This thread 16 cooperates with an internal thread 18 formed on a separate bowl 20 shown in FIG. 12. More particularly, either before or after the filter 1 of the present invention is assembled on a mount, a bowl 20 is screwed thereon to close the first end 12 of the housing 10.

As best shown in FIG. 3, the second end 14 of the housing 10 preferably includes an external annular recess 22 that receives co-planar by an interference fit annular rib 38 formed on a combination end plate/gasket retainer member 30 described below.

While certain dimensions are described below, they are suggested only by way of illustration and are not intended to limit the scope of the claims. As known in the art, fluid filters are produced in many varying sizes depending upon the application.

The inner diameter of the exemplary housing 10 shown in FIG. 1 is about 4.070 in., whereas the outer diameter is about 4.250 in. The inner diameter of an opening 28 in the external threaded portion 16 is about 2.640 in. The overall length of the housing 10 is about 3.803 in., whereas the length of the external threaded portion 16 is about 0.370 in. The thickness of the plastic along sides 24 of the housing 10 is about 0.090 in., whereas the thickness of the plastic along a base 26 of the housing 10 is about 0.120 in. The radius of the interface of the sides 24 and the base 26 is about 0.170.

The depth of the recess 22, relative to the thickness of the side 24, is about 0.030, and the distance the rib 38 projects from the end plate is slightly less than this dimension.

FIG. 4 illustrates the combination end plate/gasket retainer member 30 according to the preferred embodiment of the present invention, hereinafter referred to as the end plate member. The end plate member 30 is generally planar and has a first end or surface 32 and a second opposite end 34. The end plate member 30 is preferably made of Nylon™ 6 or the other plastics noted above used to make the housing.

As best seen in FIG. 5, the end plate member 30 includes a downwardly extending circumferential annular flange 36 upon which is formed interiorally the annular rib 38 that cooperates with the annular recess 22 shown in FIG. 3 and described above. Above the annular rib 38, at an inner interface of a generally planar area 40 of the end plate member 30 and the flange 36, there is located a well 42 to receive excess adhesive 44 used inbetween the end plate member 30 and the second end 14 of the housing 10, when the filter 1 is assembled as described below.

The adhesive is available from the Loctite, Permabond or General Electric companies.

As shown in FIGS. 3 and 5, the edges of the housing second end 14 and the end plate member 30 are radiused or tempered. This facilitates connection of the end plate member 30 on the housing 10 as described below.

As best shown in FIG. 6, the first end 32 of the end plate member 30 also includes radially inward of the flange 36 an annular projection 46 having an external thread 48. This thread 48 cooperates with a thread 62 formed on an upper end cap 60 to be described below.

Figure 7:
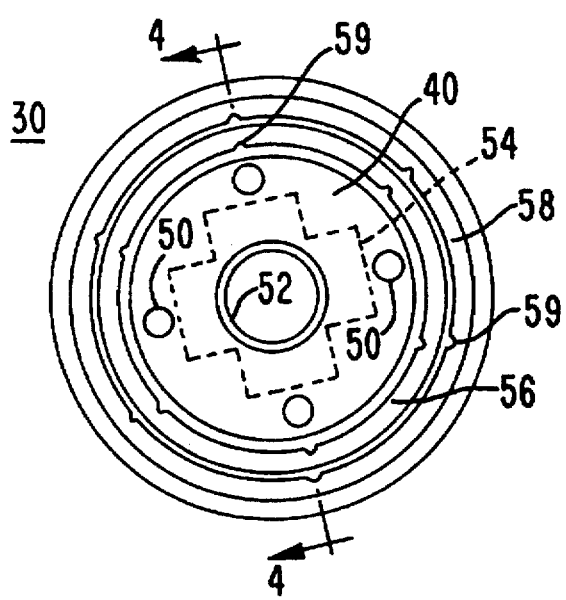
FIG. 7 is a top view of the end plate member shown in FIG. 4.

FIG. 7 is a top view of the second end 34 of the end plate member 30. As can be seen in FIGS. 4 and 7, the end plate member 30 includes therethrough equally radially spaced fluid inlet members 50, in this embodiment four. The end plate member 30 also has a central threaded aperture 52.

In the preferred embodiment, the threaded aperture 52 is molded directly into the plastic of the end plate member 30. Alternatively, a metal insert 54 can be separately formed and threaded, and the end plate member 30 can be insert molded therearound, a procedure known in the molding art. The metal insert 54 can be one of many shapes, such as cross, rectangular, square, circular, etc.

The second end 34 of the end plate member 30 also includes a plurality of gasket retainer grooves formed concentrically thereon, two 56, 58 in the embodiment illustrated. Each groove 56, 58 includes equally radially spaced molded protuberances 59 that serve to position a gasket 70 (FIG. 12) and prevent same from rotating or otherwise becoming dislodged from the groove 56, 58.

In regard to the gasket, a room temperature vulcanized gasket can be used.

The innermost groove 56 is intended to receive a gasket of a particular diameter for a particular application, whereas the outermost groove 58 is intended to receive a different diameter gasket for another application. In this way, a single end plate member 30 can be formed that can fit housings having the same diameter, but having different capacities (lengths) and/or receiving different gaskets that different applications dictate.

As can be seen, the present invention eliminates the conventional separate thick metal end plate described above that had to be welded to one of at least two separate gasket retainers. Instead, the present invention uses a single end plate member with a gasket retainer molded integrally thereof for different gasket applications, and eliminates the assembly steps related to producing an end plate with one of at least two gasket retainers and attaching the chosen retainer by welding.

Figure 8:
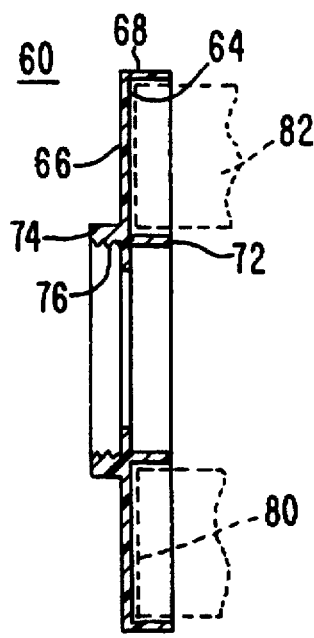
FIG. 8 is a side, cross sectional view of an upper end cap according to the preferred embodiment of the present invention.

FIG. 8 illustrates an upper end cap 60 that is also molded as one piece from a cheaper plastic than those used for the housing, or can be made of, e.g., 6/6 glass filled Nylon ™ 13%. The upper end cap 60 has a first end or surface 64 and a second end 66. The first end 64 includes a circumferential annular flange 68 and an inward annular flange 72. These flanges 68, 72 serve to support an upper end 80 of a filter media 82 therein, as discussed below.

The media 82 is conventional and is available from the Ahlstrom, Hollingsworth & Vose and Custom Papers companies.

Figure 9:
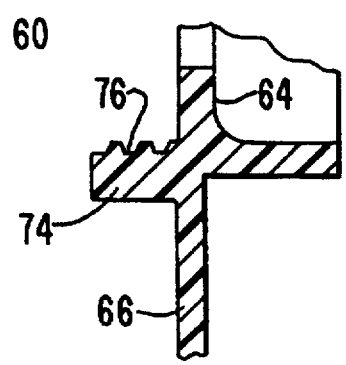
FIG. 9 is a partial enlarged view of the end cap shown in FIG. 8, illustrating particularly a threaded annular projection.

As best shown in FIGS. 8 and 9, on the second end 66 of the upper end cap 60 there is formed an annular projection 74 that includes an internal thread 76. This internal thread 76 cooperates with the external thread 48 on the projection 46 on the first end 32 of the end plate member 30, as discussed below.

Figure 10:
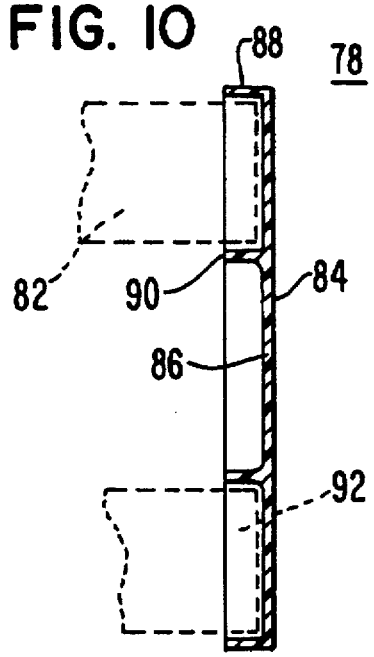
FIG. 10 is a side, cross sectional view of a lower end cap according to the preferred embodiment of the present invention.

FIG. 10 illustrates a lower end cap 78 that is also molded as one piece from plastic like the upper end cap 60. The lower end cap 78 has a first end or surface 84 and a second end 86. The first end 84 is planar. The second end 86 includes a circumferential annular flange 88 and an inward annular flange 90. These flanges 88, 90 serve to support a lower end 92 of the filter media 82 therein, as discussed below.

The upper and lower end caps 60, 78 have a wall thickness generally of about 0.60 in.

Figure 11:
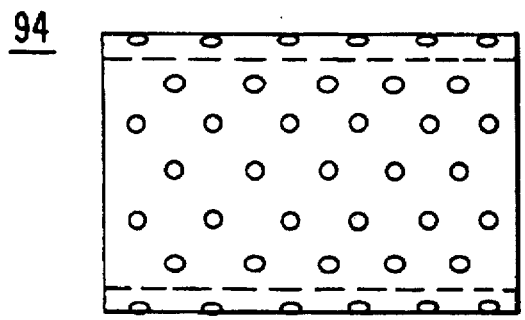
FIG. 11 is a side view of a center tube according to a preferred embodiment of the present invention.

FIG. 11 illustrates a hollow perforated center tube 94 for the media 82 according to the present invention. The tube 94 is preferably made of plastic such as polypropylene, and can be injection molded separately from the end caps 60, 78. The center tube 94 could also be made of riber. Alternatively, it is possible to mold the center tube 94 with the upper or lower end cap 60, 78 as one piece, place the cylindrical media 82 on the center tube 94/end cap 60 (78) combination and then connect the media 82/center tube 94/end cap 60 (78) combination to the other, not yet connected end cap (60) 78. The assembled media 82, center tube 94 and end caps 60, 78 will be referred to hereinafter as the media element 98.

Figure 13:
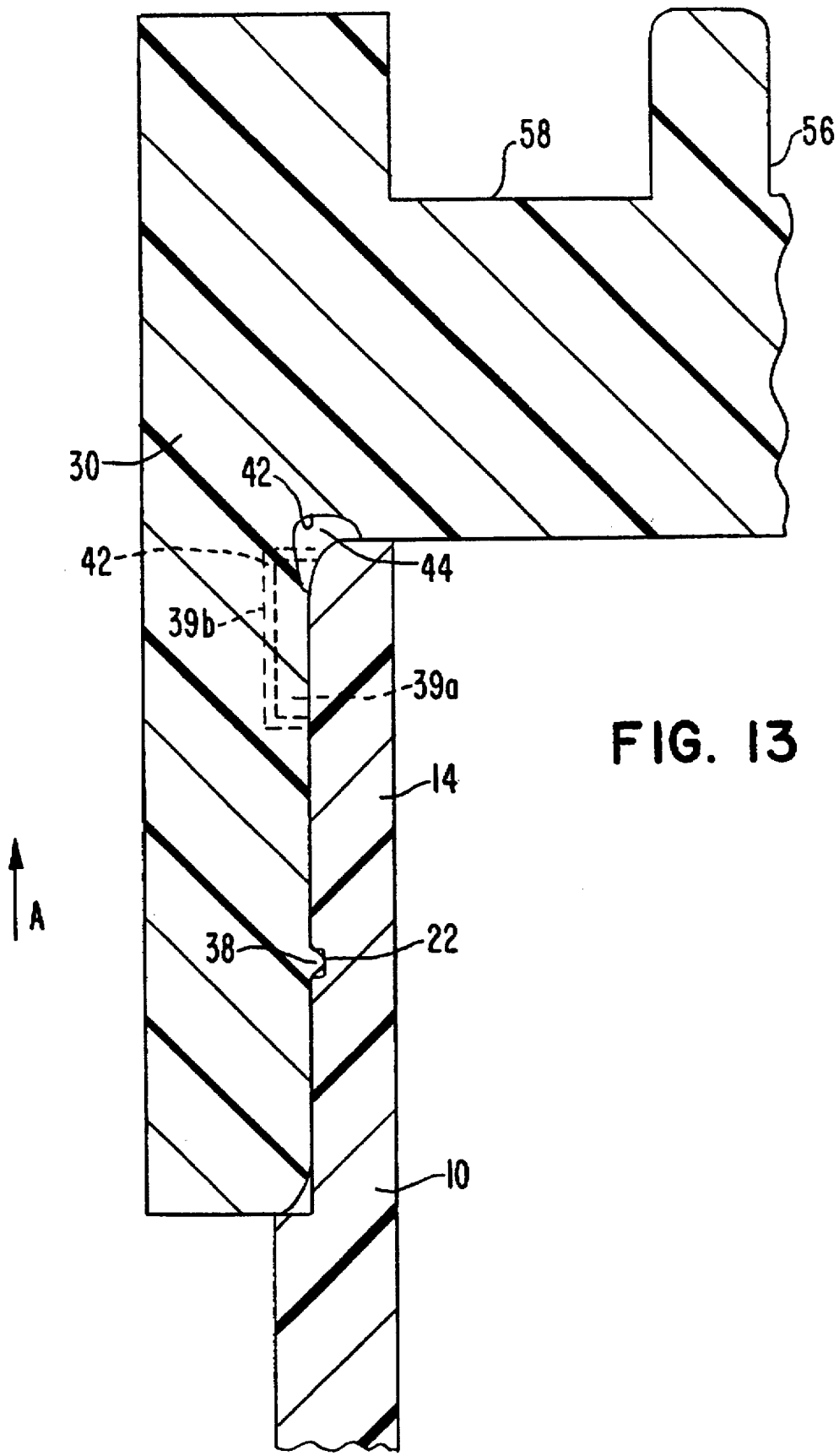
FIG. 13 is a partial enlarged view of the filter shown in FIG. 12, illustrating particularly the connection between the end plate member and the second end of the housing.

FIGS. 12 and 13 illustrates the assembly of the filter 1 according to the invention. As can be seen, the center tube 94 is located inside the paper filter media 82. Prior thereto, the media 82 is cut, cured and clipped into a cylinder as known in the art. The center tube 94 is connected between the upper and lower end caps 60, 78. The upper end cap 60 is screw threaded into the end plate member 30 via the corresponding threads 76 and 48, respectively.

It is also possible to merely mold the end caps 60, 78 and center tube 94 directly onto the cylindrical media 82. It may also be desirable to mold the media 82 directly into the end plate member 30 and eliminate the upper end cap 60. Alternatively, it is possible to insert mold the end plate member 30 around an element 98 already including the upper and lower end caps 60, 78, media 82 and center tube 94.

As shown particularly in FIGS. 12 and 13, the first end 32 of the end plate member 30 is connected to the second end 14 of the housing 10. More particularly, some adhesive 44 may be applied at the rib 38, and the well 42 adjacent the rib 38 accepts excess adhesive and creates a seal. The end plate member 30 then receives the second end 14 of the housing 10 in the direction "A" shown in FIG. 13.

The inner diameter of the rib 38 is less than the outer diameter of the second end 14 of the housing 10. Accordingly, the rib 38 pushes inward against the outer diameter of the sides 24 of the second end 14 of the housing 10 as the end plate member 30 is being pushed onto the second end 14 of the housing 10. Ultimately, the rib 38 fits into the recess 22, which has an inner diameter less than the outer diameter of the second end 14 of the housing 10 and less than the inner diameter of the rib 38. Since the inner diameter of the rib 38 is greater than the outer diameter of the second end 14 of the housing 10, once the rib 38 is in the recess 22, the rib 38 will not come out of the recess 22 unless an unusual force is exerted on the end plate member 30 relative to the housing 10. Thus, the present invention adopts an interference fit to connect the end plate member 30 and the housing 10. To further strengthen this connection, and to provide a fluid seal, the adhesive 44 can be used between the end plate member 30 and the second end 14 of the housing 10. Clearly, the end plate 30 could instead be pushed against the housing 10, if desired. Also, the rib 38 could be formed on the housing 10 and the recess 22 formed on the end plate member 30, if desired.

An added benefit of the assembly of the filter 1 of the present invention over that described above relative to U.S. Pat. No. 4,740,299, is that a bottom 100 of the media element 98 is not supported upon nor does it even contact the base 26 of the housing 10. In the described prior art filter, the element sits directly on a plastic insert and the end plate member is forced down and seamed against the upper end of the housing, with the media element being squeezed between the end plate and the adaptor. Depending upon manufacturing tolerances, the media element could be compressed during end plate connection, causing the pleats thereof to push against each other which reduces filtering efficiency. In the present invention, there is a space 102 between the base 26 of the housing 10 and the media element 98, thereby preventing any compression of the element 98.

The filter 1 is now ready to be attached to a mount 104. In this regard, the filter 1 is screwed onto the threaded stud 106 on the mount 104. Finally, a bowl 20 is attached to the first end 12 of the housing 10 to close the housing 10 and render same fluid tight.

In comparison to the filter described in U.S. Pat. No. 4,740,299, the present invention eliminates the metal housing, separately molded adaptor ring and the expensive structural adhesive for attaching the ring to the housing: all of these components are replaced by a single one-piece plastic housing.

Figure 14:
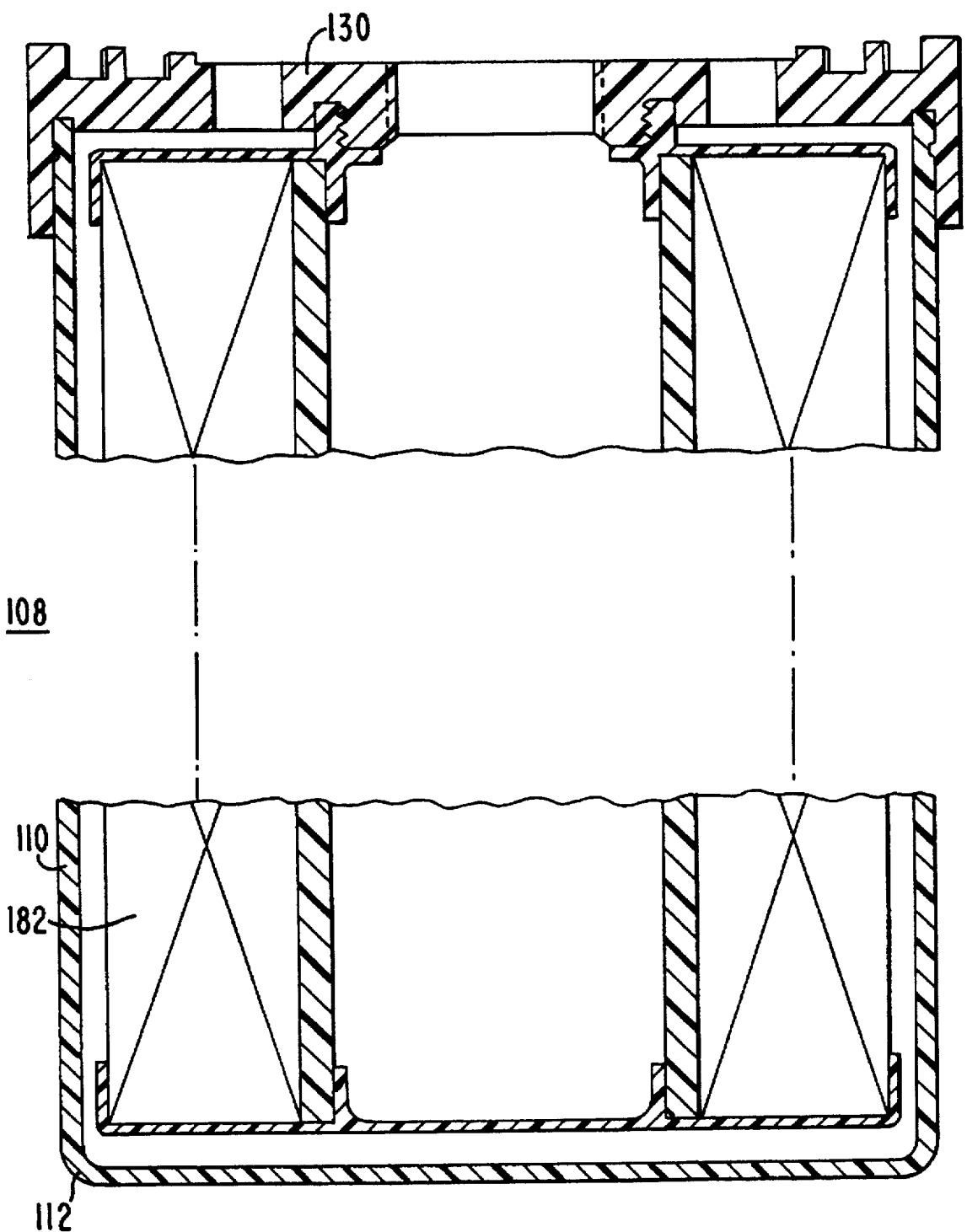
FIG. 14 is a side, cross sectional view of the assembled filter according to an alternate embodiment of the present invention.

One of the objects of the present invention is to reduce the components of a conventional fuel water separator. In this regard, it is possible to eliminate the bowl 20 altogether. More particularly, a filter 108 can include a housing 110 having a closed first end 112 as shown in FIG. 14. All other components of the filter 108 according to the present invention would be the same, such as end plate 130, except that the media 182 would be replaced with a water absorbing media instead of a water stripping media. Such media 182 is available from the Alstrom Co. located in Chattanooga, Tenn. Further, in order to ensure a capacity for removing generally the same mount of water as conventional water separators, the housing 110 according to this alternative embodiment may be longer. When the filter 108 has reached its capacity, the filter 108 is removed and merely replaced with a new similar filter. There is no need to handle a bowl as with a conventional filter or with the embodiment described above that uses a removable bowl 20.

Figure 15:
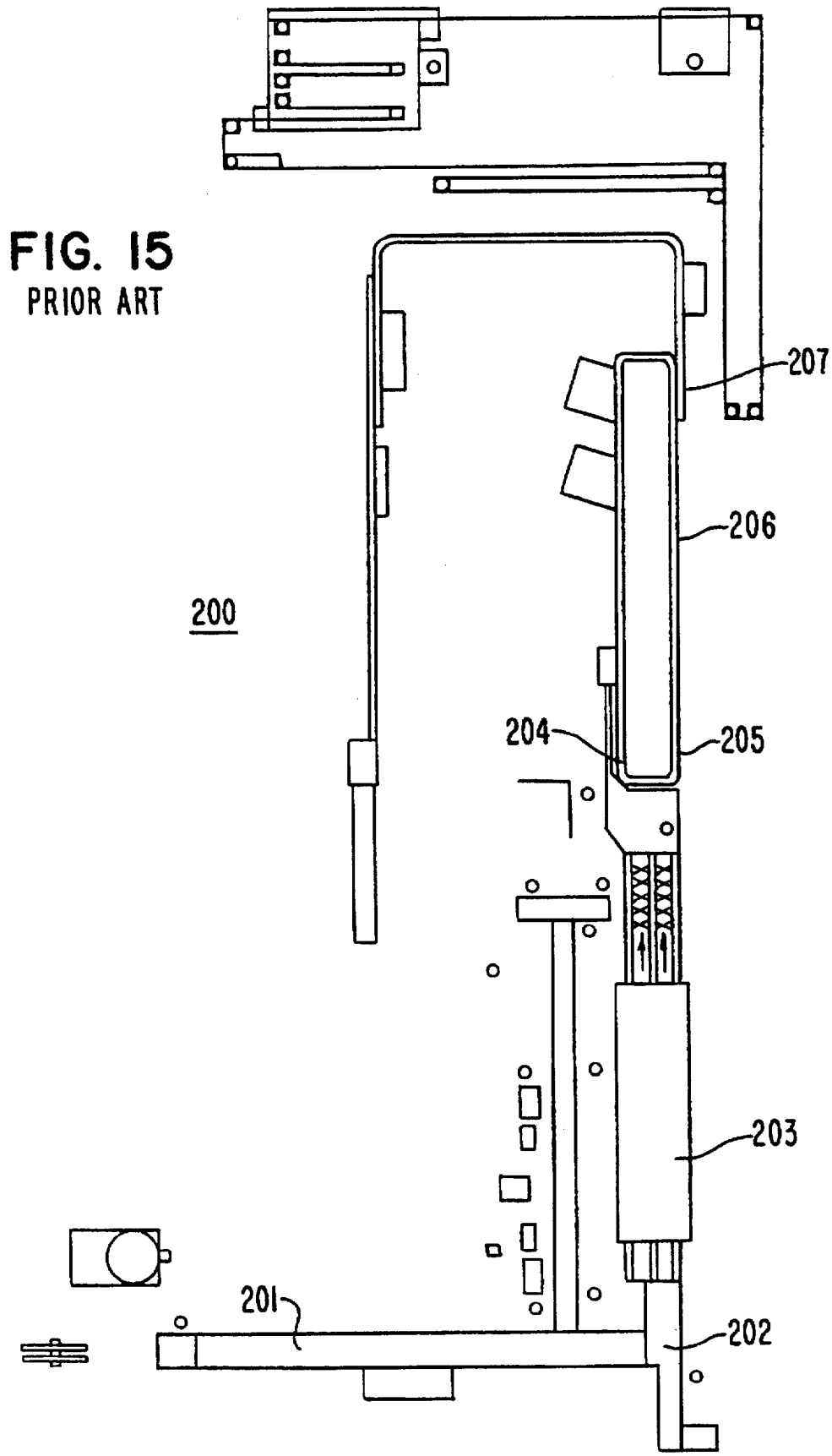
FIG. 15 is a schematic view of a method for producing a filter according to the prior art.

FIG. 15 illustrates a conventional assembly line 200 for producing a fuel water separator such as described in U.S. Pat. No. 4,740,299. In this line 200 the first station 201 is the unrolling, cutting, pleating, infrared curing and clipping of the paper filter media, all steps well known in the art. The second station 202 relates to the insertion of a metal center tube into the cylindrical media formed at station 201, and application of the metal upper and lower end caps to the media and center tube combination to form a media element. The end caps are attached using Plastisol. The media element then goes through a final cure at a third station 203. At a fourth station 204, a grommet is placed on top of the media element. At a fifth station 205, adhesive must be added to the separate plastic adaptor and the adaptor is positioned in the base of the housing, which has been separately formed by metal drawing techniques known in the art. It must be remembered that the interface of the adaptor and the lower end of the housing must act as a seal via the adhesive, without any further mechanical seal, so it must be carefully formed. This step 205 is particularly labor intensive since it is non-automated. The effective cost of this step is also relatively high since the adhesive is very expensive as noted above. At a sixth station 206, the media element is loaded in the housing against the plastic adaptor. The metal end plate, which has already been centrally threaded and to which a metal gasket retainer has already been applied, is then seamed to the housing open upper end at a seventh station 207. The filter is then painted, dried, spot leak tested for quality and packed for shipment, at subsequent stations.

Figure 16:
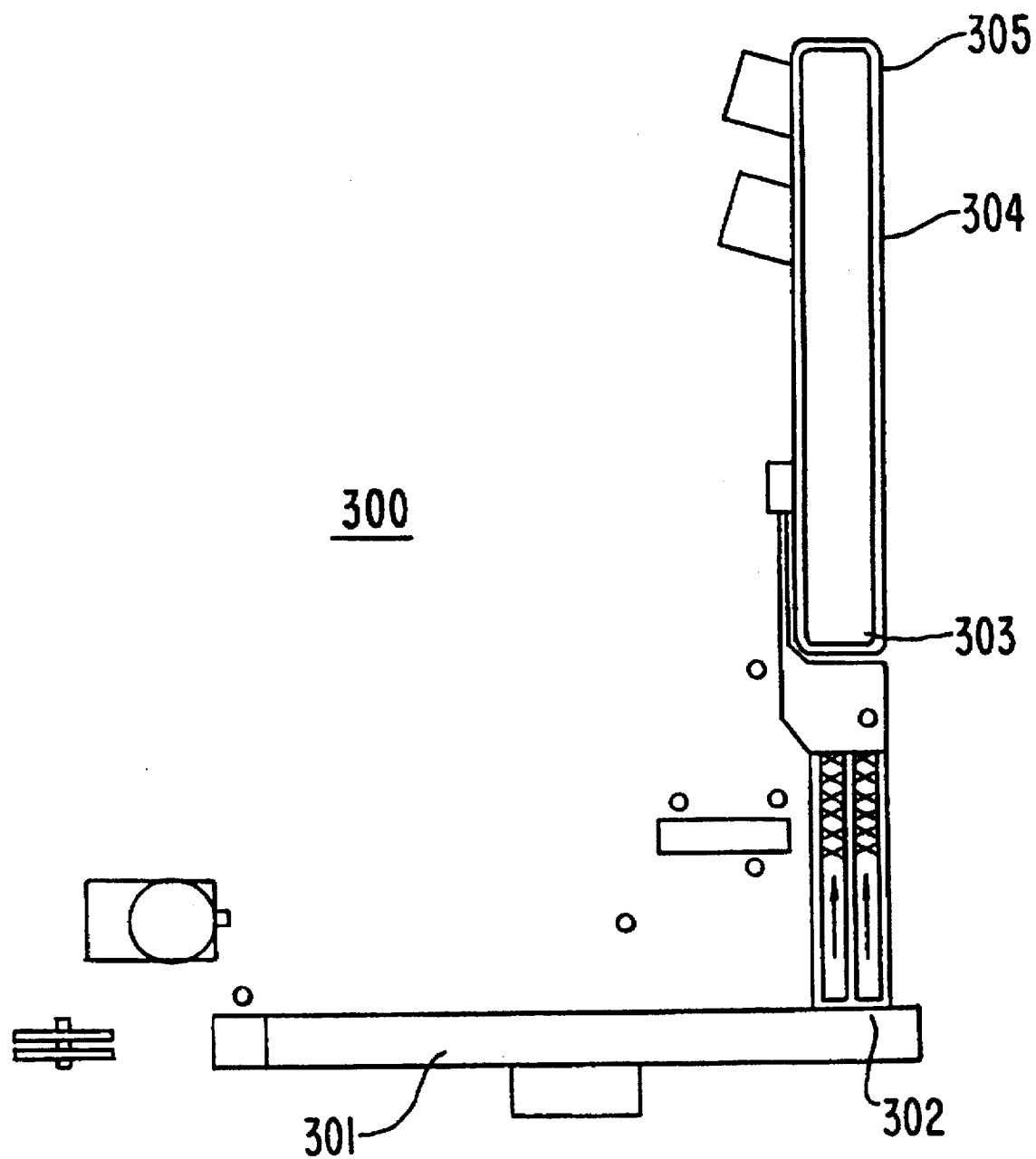
FIG. 16 is a schematic view of a method for producing a filter according to the present invention.

With the method according to the present invention, many of the above-described steps are eliminated. Reference is made to FIG. 16. In this line 300 the first station 301 is the unrolling, cutting, pleating, curing and clipping of the paper filter media, as discussed above. The second station 302, however, relates to the insertion of the plastic center tube into the cylindrical media and connection of the plastic upper and lower end caps to the media and center tube combination via, e.g. ultrasonic welding, to form a media element. There is no need for the messy Plastisol of the prior art method and the media element therefore does not need to go through a second cure. At a third station 303, the upper end cap is screwed onto the underside of the end plate member. No grommet needs to be placed into the upper end cap as was required with the prior art. No separate adaptor needs to be formed, no structural adhesive needs to be added to an adaptor, and no adaptor needs to be manually positioned in the lower open end of the housing, because the threaded lower end of the housing is integral with the housing. This avoids altogether the steps in the prior art that are particularly labor and cost intensive. At a fourth station 304, the media element is loaded in the housing. The end plate member, which is molded to include the gasket retainer, inlet holes and central threaded aperture, and which can have a small amount of adhesive applied near the rib thereof, receives the second end of the housing in the direction "A" as shown in FIG. 13. It is preferable to have the end plate member/cured element combination moving on a conveyor belt upside down, i.e., with the media on top. This facilitates automated assembly since the housing can merely be dropped down onto the end plate member/element combination. The filter is then painted, dried, tested and packed, at subsequent stations.

Overall, the method according to the present invention eliminates the prior art's third, fourth, fifth and sixth stations in their entireties, and makes the second and seventh stations far simpler, cost effective and more amenable to automation. The capital and operational costs of at least the second curer and seamer are eliminated. Also, the number of people required to run the line can be reduced to about one-third.

In addition to the above-described benefits, the present invention is more environmentally friendly by being easier to recycle. The filter, after being used in the ordinary fashion to remove a quantity of water from a fuel line system, is removed and replaced with a new filter. The used filter can be returned to a processing facility that cuts the filter open, removes the media and regrinds all the remaining plastic components for reuse in producing further filters. The paper media, which still contains some fuel, and the center tube, can be incinerated. The energy generated from the burning of the media can be harnessed according to conventional methods and used as energy to produce further filters or in the recycling efforts.

The embodiment described above which includes a metal insert molded into the end plate member is less conducive to this type of recycling since the insert must be removed from the plastic before the plastic can be re-used.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What is claimed is:

1. A fluid filter, comprising:
   a one piece plastic cylindrical housing having a wall; a first end and a second open end;
   a one piece plastic substantially planar end plate member having a wall;
   a connector formed on the housing and the end plate member;
   wherein the connector includes:
      an annular recess formed in one of the wall of the second end of the housing and the wall of the end plate member in a plane parallel to the substantially planar end plate member,
      and an annular rib formed on the other of the wall of the housing and the wall of the end plate member in a plane parallel to the substantially planar end plate member; and
   a cylindrical media element connected to the end plate member,
      wherein the end plate member is attached to the second end of the housing via an interference fit of the rib being received co-planar by the recess, between the walls of the housing and the end plate member.

2. The filter as recited in claim 1, wherein the first end of the housing is open and is threaded to receive a separate bowl.

3. The filter as recited in claim 1, wherein the first end is a closed end.

4. The filter as recited in claim 1, wherein the end plate member further includes integrally therewith a plurality of gasket grooves.

5. The filter as recited in claim 1, wherein the only connection of the element to the housing is where the element is connected to the end plate member.

6. The filter as recited in claim 1, wherein the element includes a plastic molded center tube and plastic molded upper and lower end caps.

7. A fluid filter, comprising:
   a one piece plastic cylindrical housing having a first end and a second open end;
   a one piece plastic substantially planar end plate member;
   a connector formed on the housing and the end plate member;
   wherein the connector includes:
      an annular recess on one of the second end of the housing and the end plate member,
      and an annular rib on the other of the second end of the housing and the end plate member; and
   a cylindrical media element,
      wherein the end plate member is attached to the housing via the rib being received co-planar by the recess,
      wherein the element includes a plastic molded center tube and plastic molded upper and lower end caps, and
      wherein the upper end cap is threaded for engagement with the end plate member which is also threaded.

8. A fluid filter, comprising:
   a filter housing having a first end and a second open end, the housing being injection molded as one piece from plastic, and the second end of the housing including an external annular recess;
   an injection molded end plate member which is generally planar and has a first end and a second end, the first end including a downwardly extending circular flange upon which is formed interiorally an annular rib, and radially inward of the flange a projection having an exterior thread;
   a paper cylindrical media;
   an upper end cap molded as one piece from plastic and having a first end and a second end, the first end including a circumferential flange and an inward annular flange which together serve to position an end of the media therein, and the second end including an annular projection that includes an internal thread;
   a lower end cap molded as one piece from plastic and having a circumferential flange and an inward annular flange, which together serve to position an opposite end of the media therein; and a hollow plastic center tube located inside the media and connected between the upper and lower end caps, wherein the upper end cap is screw threaded into the end plate member via the corresponding threads and the first end of the end plate member is connected to the second end of the housing via cooperation of the rib and recess.

9. The filter as recited in claim 8, wherein the first end of the housing is open and threaded to receive a separate bowl.

10. The filter as recited in claim 8, wherein the first end is a closed end.

11. The filter as recited in claim 8, wherein adhesive is located between the end plate member and the second end of the housing and, adjacent the rib, there is located a well that receives excess adhesive.

12. The filter as recited in claim 8, wherein the end plate member includes a central threaded aperture.

13. The filter as recited in claim 12, wherein the central threaded aperture is formed directly in the plastic of the end plate member.

14. The filter as recited in claim 8, wherein the second end of the end plate member also includes a plurality of gasket retainer grooves formed concentrically thereon.

15. The filter as recited in claim 14, wherein an innermost one of the plurality of grooves receives a gasket of a first diameter, and an outermost one of the plurality of grooves receives a gasket of a second, different diameter.

16. The filter as recited in claim 8, wherein adhesive is located at the rib and a well is formed adjacent the rib.

17. The filter as recited in claim 8, wherein an inner diameter of the rib is less than an outer diameter of the second end of the housing.

18. The filter as recited in claim 8, wherein the media is spaced from the housing except where the media is connected to the end plate member.

19. A method for manufacturing a fluid filter, comprising the steps of:

forming a media element to include paper media;

molding a substantially planar plastic end plate member;

connecting the media element to the end plate member;

forming a one piece plastic filter housing to include a first end and a second open end; and attaching the end plate member to the second open end of the filter housing, wherein the step of forming the second end of the housing includes the step of forming one of a rib and an annular recess on a wall of the second end in a plane parallel to the substantially planar end plate member, the step of forming the end plate member includes the step of forming the other of the annular rib and recess on a wall of the end plate member in a plane parallel to the substantially planar end plate member, and the step of attaching the end plate member to the second open end of the filter housing includes the step of inserting the rib into the recess between the walls of the second end of the housing and the end plate member to create an interference fit.

20. The method as recited in claim 19, wherein the step of forming the housing includes the step of forming the first end to be a closed end.

21. The method as recited in claim 19, wherein the step of forming the housing includes the step of forming the first end to be an open end that receives a separate bowl.

22. The method as recited in claim 19, wherein the step of forming the element further includes the steps of forming a hollow plastic center tube, inserting the center tube in the paper media, forming an upper plastic surface for the media element, and attaching the center tube to the upper plastic surface of the media element.

23. The method as recited in claim 22, wherein the step of forming the element further includes the steps of forming a plastic lower surface for the media element, and attaching the plastic lower surface to the plastic center tube opposite the plastic upper surface.

24. The method as recited in claim 19, wherein the step of forming the end plate member includes the step of forming a plurality of concentric gasket retainers on the end plate member.

25. A method for manufacturing a fluid filter, comprising the steps of:

forming a one-piece cylindrical plastic housing having one of a recess and a rib formed thereon;

forming a cylindrical paper media;

forming a plastic center tube;

inserting the plastic center tube into the cylindrical media;

forming upper and lower plastic end caps, each receiving respective ends of the cylindrical media, and the upper end cap including threads;

forming an end plate member with threads and the other of the recess and rib formed thereon;

connecting the media, upper and lower end caps to the center tube to form a media element;

screwing the upper end cap onto the end plate member via the threads; and connecting the end plate member and the housing, so that the rib is received by the recess.

26. The method as recited in claim 25, wherein the step of forming the end plate member includes the steps of forming a metal insert and insert molding the metal insert into the end plate member.

27. The method as recited in claim 25, wherein the end plate member is formed to include a plurality of gasket grooves.

28. A fluid filter, comprising:

a one piece plastic housing having a first end and a second open end;

a one piece plastic substantially planar end plate member connected to the second, open-end of the housing and being threaded; and a media element including a plastic molded end cap threaded for engagement with the threaded end plate member.

29. The filter as recited in claim 28, wherein the first end of the housing is open and is threaded to receive a separate bowl.

30. The filter as recited in claim 28, wherein the first end is a closed end.

31. The filter as recited in claim 28, wherein the end plate member further includes integrally therewith a plurality of gasket grooves.

32. The filter as recited in claim 28, wherein the element is spaced from the housing except where the element is connected to the end plate member.

33. The filter as recited in claim 28, wherein the element includes a plastic molded center tube and a second molded end cap.

34. A fluid filter, comprising:

a filter housing having a first end and a second open end, the housing being injection molded as one piece from plastic;

an injection molded end plate member which is generally planar and has a first end and a second end, the first end being threaded;

a filter media;

an upper end cap molded as one piece from plastic and having a first end and a second end, the first end for receiving an end of the media, and the second end being threaded corresponding to the threaded end plate;

a lower end cap molded as one piece from plastic for receiving an opposite end of the media; and a hollow plastic center tube located inside the media and connected between the upper and lower end caps, wherein the upper end cap is screw threaded into the end plate member and the first end of the end plate member is connected to the second end of the housing.

35. The filter as recited in claim 34, wherein the first end of the housing is open and is threaded to receive a separate bowl.

36. The filter as recited in claim 34, wherein the first end is a closed end.

37. The filter as recited in claim 34, wherein adhesive is located between the end plate member and the second end of the housing.

38. The filter as recited in claim 34, wherein the end plate member includes a central threaded aperture.

39. The filter as recited in claim 38, wherein the central threaded aperture is formed directly in the plastic of the end plate member.

40. The filter as recited in claim 34, wherein the second end of the end plate member also includes a plurality of gasket retainer grooves formed concentrically thereon.

41. The filter as recited in claim 40, wherein an innermost one of the plurality of grooves receives a gasket of a first diameter, and an outermost one of the plurality of grooves receives a gasket of a second, greater diameter.

42. The filter as recited in claim 34, wherein the media is spaced from the housing except where the media is connected to the end plate member.

43. A method for manufacturing a fluid filter, comprising the steps of:

forming a one-piece plastic housing having a first end and a second, open end;

forming a media element including a filter media and an end cap including threads and receiving an end of the media;

forming an end plate member with threads corresponding to the threads on the end cap;

screwing the end cap onto the end plate member via the corresponding threads; and connecting the end plate member and the housing.

44. The method as recited in claim 43, wherein the step of forming the end plate member includes the steps of forming a threaded metal insert, and insert molding the metal insert into the end plate member.

45. The method as recited in claim 44, wherein the end plate member is formed to include a plurality of gasket grooves.

46. The method as recited in claim 44, wherein the step of forming the housing includes the step of forming the first end to be a closed end.

47. The method as recited in claim 44, wherein the step of forming the housing includes the step of forming the first end to be an open end that receives a separate bowl.

48. A fluid filter, comprising;

a one piece plastic cylindrical housing having a first end and a second open end;

a one piece plastic substantially planar end plate member;

a connector formed on the housing and the end plate member, wherein the connector includes an annular recess on one of the second end of the housing and end plate member, and an annular rib on the other of the second end of the housing and the end plate member; and a cylindrical media element, wherein the end plate member is attached to the housing via the rib being received co-planar by the recess, and wherein the upper end cap is threaded for engagement with the end plate member which is also threaded.

* * * * *